United States Patent [19]

Cyin

[11] 4,360,332

[45] Nov. 23, 1982

[54] NOODLE MACHINE

[76] Inventor: Maxwell U. D. Cyin, 352 W. Lomita, Apt. 3, Glendale, Calif. 91204

[21] Appl. No.: 314,125

[22] Filed: Oct. 23, 1981

[51] Int. Cl.³ .............................................. A01J 21/00
[52] U.S. Cl. ..................................... 425/191; 99/353; 222/389; 425/376 R; 425/464
[58] Field of Search ............ 425/182, 190, 191, 191 S, 425/376 R, 381, 461, 464; 222/330, 389; 426/496, 503; 99/353

[56] References Cited

U.S. PATENT DOCUMENTS

| | | | |
|---|---|---|---|
| 1,724,545 | 8/1929 | Ambrette | 425/190 |
| 1,996,628 | 4/1935 | Schneider | 425/191 |
| 3,216,850 | 11/1965 | Merrill | 425/191 |
| 3,680,994 | 8/1972 | Longenecker | 425/191 |

Primary Examiner—Willard E. Hoag
Attorney, Agent, or Firm—Gene W. Arant

[57] ABSTRACT

A noodle making machine including a cylindrical dough magazine with a powered plunger therein and an apertured expressing die on the end of the dough magazine, wherein the expressing die can be removed from the end of the cylindrical magazine, the magazine removed from the remainder of the machine to expose its interior and the surface of said plunger and its supporting rod, the several parts being quickly and readily separable for quick and easy cleaning to comply with Health Department rules and ordinances.

4 Claims, 6 Drawing Figures

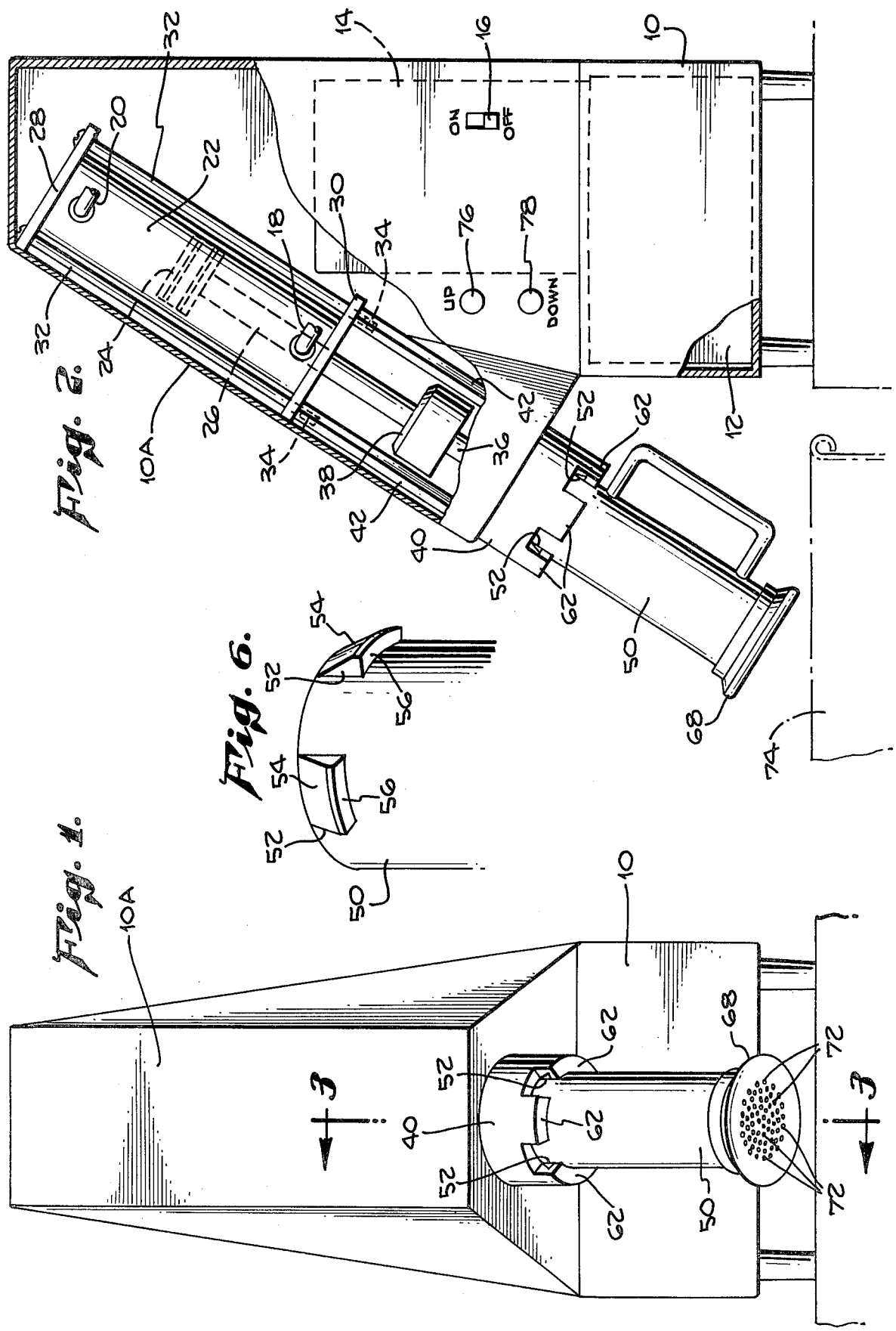

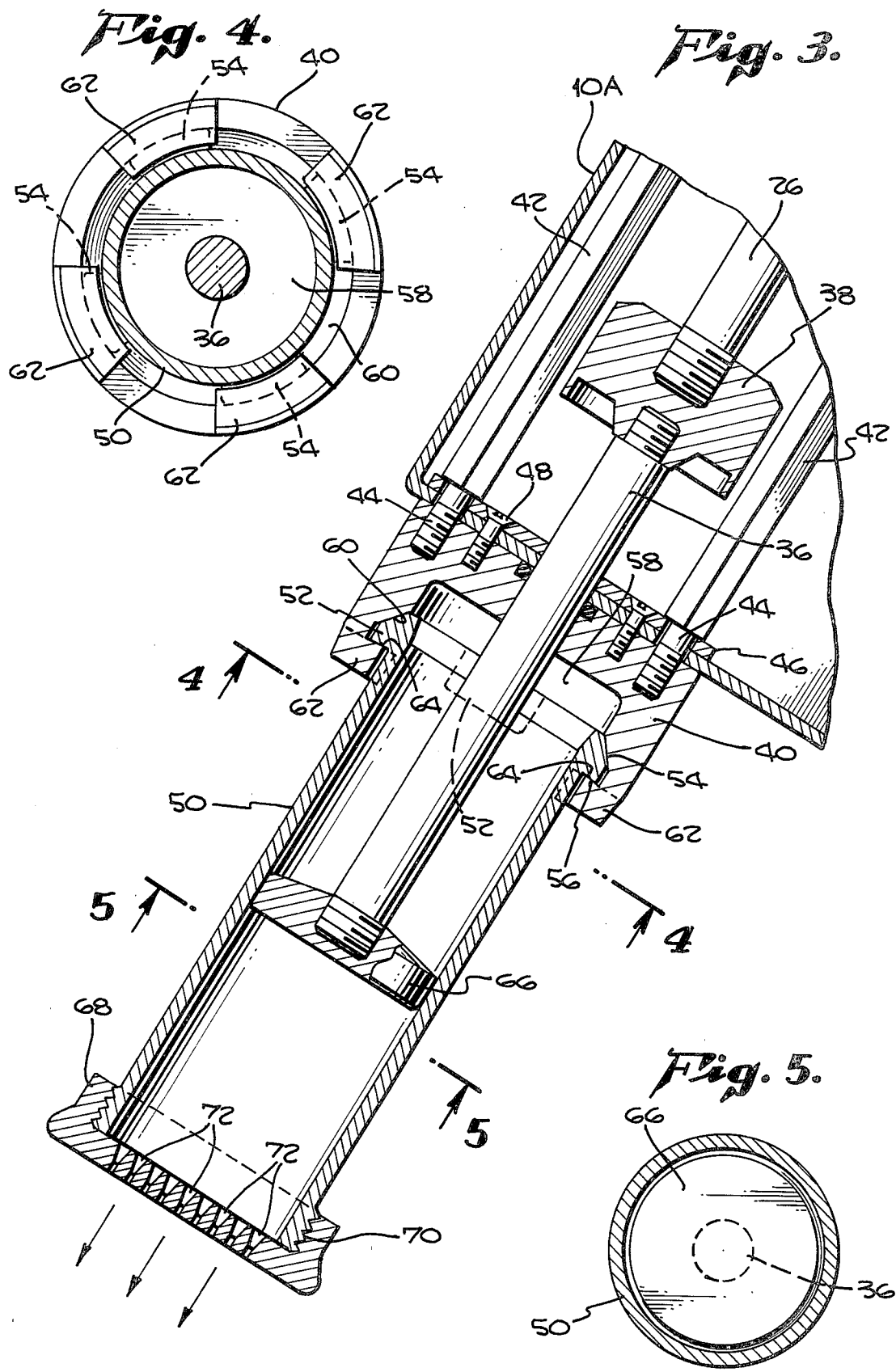

NOODLE MACHINE

FIELD OF INVENTION

The invention lies in the field of food equipment and more particularly with noodle making machines wherein a machine is charged with dough and it is forced under pressure through an expressing die. The machine herein is one which is adapted for used in restaurants for filling individual orders from customers and wherein the noodles are expressed from the machine and directly into boiling water for rapid cooking.

PRIOR ART

Noodle expressing machines with plungers actuated by hydraulic rams, the plungers being located in cylindrical magazines and being adapted to express the noodle dough through dies have been known and used heretofor. These machines, however, have been so constructed that those portions of the machine with which the dough comes into contact are practically impossible to clean in compliance with health regulations in many jurisdictions. The taking apart and cleaning of the conventional machines more nearly requires the services of a mechanic rather than a cook. The dough magazine conventionally is permanently secured to the rest of the machine so that the interior thereof and the dough expressing plunger are quite inaccessable for proper cleaning. The prior art machines have removeable expressing dies at the lower ends of the dough magazine but this does not provide sufficient access to the interior to permit the users to comply with health regulations. Additionally, certain jurisdictions require complete cleaning of the interior parts contacted by the dough each time the magazine is emptied of dough, with the result that the device must be taken apart and reassembled quickly in order to keep up with customer demand during busy mealtime hours.

Noodles, as generally known in the Western World, are flat thin strips of dough which are dried and later used in soups or other dishes. There is an oriental type of noodle in which the dough is pressed through a die having multiple openings and immdiately fed into boiling water where it is cooked. Sometimes these noodles are cooled and served with sauces and for other orders, they are served promptly while they are still hot from being cooked. In either event, it is customary to cook the noodles to order for customers in a restaurant. Also, to insure the freshness of the product, the noodle expressing devices are purposely made so that they will not hold too large a quantity of noodle dough.

Because of the above described manner of making and serving the oriental type noodles, and because of stringent health regulations in the United States and other countries where oriental noodles are becoming more popular, it has become necessary to thoroughly clean the interior of the noodle machines prior to charging them with a fresh batch of dough. Not only has the conventional type of machine been nearly impossible to clean satisfactorily, but the frequent cleaning required consumes time in the kitchen and causes a longer wait for the customer.

The present invention comprises a noodle machine which can be quickly and easily cleaned to properly meet the requirements of health regulations and to give more prompt service to the customer. The objects and advantages of the invention will more fully appear from the following description in connection with the accompanying drawings.

FIG. 1 is a front elevational view.

FIG. 2 is a side elevational view with portions broken away and some interior structure shown in broken lines.

FIG. 3 is an enlarged fragmentary sectional view taken approximately on the line 3—3 of FIG. 1.

FIG. 4 is a transverse section taken approximately on the line 4—4 of FIG. 3.

FIG. 5 is a transverse sectional view taken approximately on the line 5—5 of FIG. 3.

FIG. 6 is an enlarged fragmentary perspective view of part of the top of the cylindrical dough magazine.

There is a base or housing 10 in the lower portion of which is a liquid reservoir 12 connected in a suitable manner not shown, but well known in the art, through a hydraulic pump 14 controlled by a switch 16 to conduits 18 and 20. These conduits communicate with the interior of a hydraulic cylinder 22 at opposite sides of a piston 24 having a piston rod 26 which extends downwardly through the lower end of the cylinder 22. Cylinder 22 is held between a pair of plates 28 and 30 by means of rods 32 which pass through the upper plate 28 and are threaded into the lower plate 30 as indicated at 34 in FIG. 2.

An axial extension of the piston rod 26 comprises a dough plunger rod 36 connected to the piston rod 26 by a connector element 38 in which the plunger rod 36 may be threaded and removeable therefrom.

A dough cylinder end cap 40 is secured to the lower portion of the downwardly slanting base or casing 10A by means of rods 42 whose upper ends are threaded upon downwardly extending portions of the threaded lower ends 34 of rods 32. The lower ends of the rods 42 are threaded as at 44 into the dough reservoir end cap 40. A clamping plate 46 lies inside the bottom of the slanted housing portion 10A and is held by short screws 48 which are threaded into the dough magazine in cap 40 to clamp the housng wall and strengthen the mounting of the dough magazine end cap 40.

There is shown a cylindrical dough magazine 50 which, as illustrated in FIG. 6 is provided with circumferential spaced lugs 52 having inwardly and upwardly tapered side walls 54 and relatively flat, downwardly facing bottom surfaces 56. The dough magazine connector cap 40 is provided with a recess 58 having slanted undercut portions 60 axially spaced from inwardly directed lugs 62 spaced about the mouth of the recess 60. Lugs 62 have upwardly facing abutment surfaces 64 which are engageable by the downwardly facing abutment surfaces 56 on the lugs 52 of the cylindrical dough magazine 50.

It should be noted that, while it cannot be clearly shown in the drawings, the cooperating abutment surfaces 56 and 64 of lugs 52 and 62 are at slight angles to planes truly transverse to the cylindrical dough magazine 50 and the connector 40, so that when lugs 52 are inserted upwardly between lugs 62 and the magazine is rotated, the slight slant on the lugs will hold the dough magazine firmly yet readily releasably in position.

The dough magazine plunger rod 36 has a plunger 66 which, of course, moves longitudinally of the cylindrical dough magazine 50 when the piston rod 26 and plunger rod 36 are moved longitudinally. Below the plunger 66 of the lower end of the cylindrical dough magazine 50 is a dough expressing die 68 removable secured to the cylindrical magazine as by threads 70. The expressing die 68 is provided with a plurality of small orifices 72 through which dough is extruded. In FIG. 2 there is shown in broken lines a portion of a cooking vessel 74 into which the elongated, almost thread-like noodles are directed. The vessel 74 customarily contains boiling water which immediately cooks the noodles as they are formed.

In order to control the movement of the hydraulic piston 24 and the dough plunger 66, there is provided a suitable and conventional control, not shown which may comprise hydraulic flow valve switch buttons 76 and 78. These controls are part of the conventional machines and are provided so that the hydraulic piston 24 and the dough plunger permit charging of the charging of the cylindrical dough magazine 50 with the plunger at the top thereof.

It will be seen that when the magazine has been emptied to the greatest extent possible by movement of the dough plunger 38 downwardly to the expressing die 68, the machine is empty, but before refilling with dough, it must be thoroughly cleaned. Preparations for cleaning are quick and simple. The expressing die 68 can be quickly unscrewed from the bottom of the cylindrical magazine 50 and the magazine itself with a partial turn can be released from the lugs 62 on the connector element 40. Thus the interior and exterior of the dough magazine are freely accessible for cleaning, as is true of the interior and exterior of the expressing die 68. Also the dough plunger can be quickly and easily cleaned while supported by the plunger 36. If desired, of course, the plunger rod 36 can be unscrewed from the connector element 38 and withdrawn for cleaning, but this is not necessary since most of the rod is exposed when the plunger is in its downward position and the plunger rod does not come into contact with the dough in any position.

It will of course be understood that various changes can be made in the formed details arrangement and proportions of the various parts without departing from the spirit of the invention.

What is claimed is:

1. An easily cleanable noodle expressing machine comprising:
    a base having a reservoir and a hydraulic pump,
    a downwardly directed ram carried by said base and having a ram cylinder and a piston and piston rod therein,
    said piston rod extending from the lower end of said ram cylinder,
    a connector cap for a cylindrical dough magazine supported by said base below said ram cylinder,
    a cylindrical dough magazine having a upper end detachably connected to said connector,
    an expressing die detachably mounted on the lower end of said cylindrical dough magazine,
    an axial extension of said piston rod projecting downwardly from the piston rod, through said connector cap and into said cylindrical dough magazine,
    a plunger head on said axial extension in said cylindrical dough magazine,
    said expressing die being removable from the cylindrical dough magazine, the cylindrical dough magazine being removable from the connector cap, and the piston rod extension, the plunger head, the interior of said cylindrical dough magazine, the exposed face of said connector cap and the interior face of said expressing die all being exposable for cleaning.

2. The structure in claim 1, and a coupling on the end of said ram piston rod,
    and said axial extension of said piston rod being detachably connected to said coupling to permit removal of said axial extension for cleaning.

3. The structure in claim 1, and said connector cap having a multiple interruption flange defining lugs with spaced first abutment surfaces in planes transverse to the longitudinal axis of said cylindrical dough magazine,
    and the upper outer wall portion of said cylindrical dough magazine having lugs spaced thereabout with other abutment surfaces opposed to said first abutment surfaces for positioning above the lugs on said connector cap.

4. The structure in claim 3, and said cylindrical dough magazine having external threads upon which said expressing die is threadedly secured,
    and said cylindrical dough magazine having a smooth unbroken inner wall from end to end.

* * * * *